Patented July 6, 1937

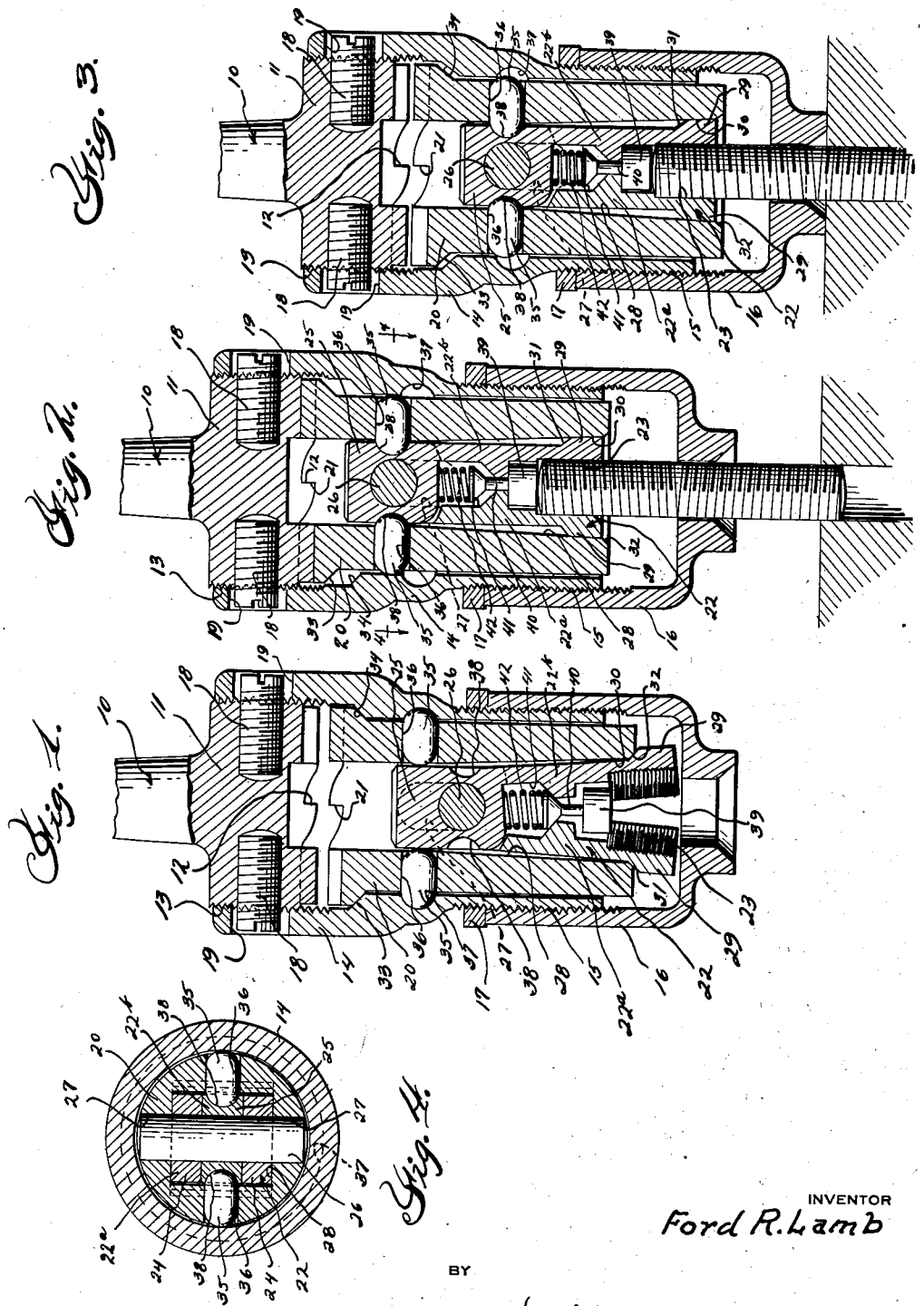

2,086,167

UNITED STATES PATENT OFFICE 2,086,167

STUD SETTER

Ford R. Lamb, Detroit, Mich.

Application June 28, 1934, Serial No. 732,947

12 Claims. (Cl. 81—53)

This invention relates to stud setters and has as its objects to simplify, render more efficient and improve generally devices of this character.

One of the other important objects of this invention is to provide a stud setter having means insuring an accurate and complete engagement of the socket with the stud prior to the engagement of the clutch parts carried by the driving and driven members of the device, and further insuring a complete disengagement of the driven member from the driving member prior to the release of the stud by the socket member.

Another object of the invention is to provide means for positively resisting separation of the jaw members or socket sections due to torsional strains to thus insure an accurate engagement of the socket member with the work.

Another object of the invention is to provide for multiple accurate adjustment of the device permitting facile regulation of the distance the studs or other work is driven.

Numerous other objects and advantages, as well as the novel details of construction of this invention, will be made more apparent as this description proceeds, especially when considered in connection with the accompanying drawing, wherein Figure 1 is a sectional elevational view of a stud setter constructed in accordance with my invention;

Figure 2 is a similar sectional view showing the relation of the device to the work when in stud driving position;

Figure 3 is a similar view showing the device at the moment of release of the drive connection, and Figure 4 is a transverse sectional view taken substantially on the plane indicated by line 4—4 in Figure 2.

Referring now particularly to the drawing wherein like reference characters indicate like parts, the reference character 10 indicates fragmentarily a tapered shank for engagement with the rotating holder or chuck of a drill press or other driving means. Secured to or formed integrally with the shank 10 is a head 11 provided on its lower face with clutch teeth 12.

Preferably adjustably secured to the head 11, as by means for instance of screw threads 13, is a substantially cylindrical or sleeve-like member 14. Telescoping the lower end of the sleeve 14 and adjustably secured thereto by means of screw threads 15 is a collar 16. A lock nut 17 is provided for locking the collar 16 in place after the same has been adjusted. The sleeve 14 is locked in position, after being adjusted with respect to the head 11, by means of one or more set screws 18 which project through longitudinally extending slots 19 formed in the sleeve 14. By removing the set screws the head 11 may be turned through one or more revolutions to axially adjust the same and consequently the clutch face or element 12 thereof within the sleeve.

The parts 10, 11, 14, and 16 may be considered the driving member of the device.

Mounted within the driving member is a clutch sleeve 20. This clutch sleeve 20 is provided with a clutch face or clutch teeth 21 complementary to the clutch element 12. The clutch sleeve 20 is mounted for sliding movement longitudinally of the driving member along the axis of rotation thereof. Mounted within the clutch sleeve 20 for movement longitudinally thereof along the axis of rotation is a socket member or nut 22. This socket or nut member is formed of two sections 22$^a$ and 22$^b$, each section being shaped at its lower end so that these sections jointly form a tapped stud engaging socket 23. The upper end of one of the socket sections is bifurcated forming a pair of spaced furcations 24, the upper end of the other socket section being provided with a tongue 25 which fits between the furcations 24. The two socket sections are supported upon a pivot pin 26, the projecting ends of which engage respectively in a pair of opposed longitudinally extending slots 27 formed in the clutch sleeve 20. This mode of interconnecting the pivotal ends of the socket sections prevents any relative shifting of these socket sections during their relative angular movement.

In order to effectively resist torsional strains to which the same is subjected, the socket or nut member 22 is rectangular in cross section, as seen in Figure 4, and fits within the rectangular bore or opening 28 of the clutch sleeve 20. This bore or opening 28 tapers or flares outwardly towards its lower end to provide a clearance between the face of the opening and the socket member. The lower end of the socket member is provided with flanges or enlargements 29 which, when the socket member is in stud driving position, are adapted to fit snugly within the portion 30 of the clutch sleeve, thus holding the socket sections in abutting position and gripping relation with the stud or work. To assist in moving the socket sections into abutting relation, as this socket member is forced into the opening in the clutch sleeve, a pair of the opposed faces of the socket member are provided with beveled surfaces 31 which engage a pair of cooperating beveled surfaces 32 formed on opposed edges at the lower end of the clutch sleeve.

The clutch sleeve 20 has a circular or round exterior and is dimensioned so as to provide a clearance between it and the inner surface of the sleeve 14 of the driving member thereby permitting of ready relative rotation between these parts. For supporting the clutch sleeve in its non-coupled position, the sleeve is provided at its upper end, adjacent its clutch face, with an annular preferably beveled surface 33 which, as illustrated in Figure 1, is adapted to engage an annular beveled surface 34 formed on the inner face of the driving sleeve member 14. Thus the engagement of the surfaces 33 and 34 limits the movement of the clutch sleeve in one direction and the engagement of the complementary clutch elements 12 and 21 limits the movement of the clutch sleeve in the other direction. The relative sliding movement between the clutch sleeve 20 and the socket or nut member 22 is limited by the length of the slots 27 in which the pivot pin 26 works.

As heretofore mentioned, it is particularly advantageous to provide positive means for preventing an engagement of the clutch elements, and as a consequence an establishment of the drive to the socket member prior to a complete accurate and positive engagement of the socket member with the stud or other work. To accomplish this object, I provide locking or latching means which, prior to the engagement of the socket with the work, prevents movement of the clutch sleeve into clutch engaging position, this locking or latching means being subsequently released by the movement of the socket member instant to its engagement with the stud or work.

The particular form of means for accomplishing this, which is herein illustrated, consists of a pair of opposed latching elements or members 35 movable radially of the clutch sleeve 20 through a pair of radially disposed openings 36. The inner face of the driving sleeve member 14 is provided with an annular groove 37 and the faces of the socket member adjacent to the latch elements 35 are provided with a pair of recesses 38.

With the socket member 22 in its lowermost position, as illustrated in Figure 1, the latching members 35 are held into engagement with the annular groove 37 by the adjacent faces of the socket member. This therefore interlocks the clutch sleeve 20 with the driving sleeve member 14 and prevents any relative axial sliding movement of the clutch sleeve into clutching position. When, however, the socket member is moved axially of the clutch sleeve instant to the engagement thereof with the work, the recesses 38 formed therein are brought opposite the latching elements 35 thus permitting radial inward movement of these latching elements to free them from the annular groove 37. The clutch sleeve is thereupon freed from the driving sleeve member 14 and permitted to move axially of the device together with the socket member into clutching position. However, as will be evident from an examination of the drawing, the several parts are so designed and dimensioned that the socket member will not free the latching elements to permit a movement of the clutch sleeve until after the flanges or enlargements 29 thereof are engaged within the portion 30 of the clutch sleeve thus insuring a tight gripping engagement between the socket and stud before the driving connection is established.

While the clutch elements are engaged, the latching elements 35 are held in engagement with the recesses 38 by the inner face of the driving sleeve 14, and this interlocking relation between the socket member and the clutch sleeve is maintained until after the disengagement of the clutch elements. The further downward movement of the clutch sleeve and socket member, after the release of the drive connection, brings the latching elements opposite the groove 37 to release them from engagement with the recesses 38, and permit the further relative downward movement of the socket member, due to its weight, to the release position illustrated in Figure 1 wherein the socket sections are relatively angularly displaced to free the stud.

A wear resisting and thrust element 39 is preferably associated with the socket recess at the upper end thereof. This element may be conveniently held in position by providing the same with a neck portion 40 terminating in a head, the latter being arranged in a recess 41 formed in the socket member. A spring 42 may be provided for normally urging the element 39 downwardly to assist in freeing the work from the socket member.

The distance between the clutch elements, and consequently the period during which these clutch elements will remain in driving engagement, may be regulated by adjusting the driving sleeve 14 with respect to the head 11.

The collar 16 may be adjusted to also regulate the time the clutch elements are in driving relation, it being understood that when the lower edge of the collar 16 has engaged the face of the work, the driving connection between the clutch parts will continue, due to the engagement of the stud with the work, only until the relative movement between the clutch sleeve and the driven member has caused a release of the clutch elements and as a consequence a cessation of the drive to the socket member. By reason of the adjustable sleeve 16, the necessity for using the ordinary gauge block is practically eliminated.

From the foregoing description it is believed that the operation of the device will be readily apparent to those skilled in this art. It will probably be sufficient to state that with the parts in the position shown in Figure 1 the socket member is engaged with the stud, which has previously been manually turned into a slight initial engagement with its bore sufficient to hold the stud upright. The resulting upward movement of the socket member causes the socket sections to be brought into abutting relation and into gripping relation with the stud by reason of their engagement within the portion 30 of the clutch sleeve 20. Subsequent to the engagement of the socket with the stud, the recesses 38 are brought opposite the latching elements 35, thus permitting radial inward movement of these latching elements and the release of the clutch sleeve from the driving sleeve 14. At this moment, the pivot pin 26 has engaged the upper end of the slots 27 and thus the socket member and clutch sleeve move together until the clutch face 21 of the clutch sleeve 20 engages the clutch face 12 of the head 11. The drive connection between the driving and driven parts of the device is thus established and the stud is rotated, the whole device traveling downwardly therewith until the lower edge of the collar 16 engages the face of the work. Then downward movement of the driven member stops and the clutch sleeve and socket member partake of a further downward movement relative to the driving member until the clutch elements are separated to disconnect the drive. Thereupon, the device is pulled upwardly away from the stud and the parts again assume the position illustrated in Figure 1 wherein the socket sections are separated to fully release the stud.

Owing to the fact that the driving connection is not established until after the socket has gripped the stud and is disconnected prior to the time the socket releases the stud, all liability of stripping or mutilating the threads on the stud is eliminated.

With the herein described construction, the drive from the clutch sleeve 20 to the socket member is not only through the pivot pin 26, but also through the rectangular engaging surfaces of the sleeve and socket at the zone 29—30 which, as will be noted, is immediately adjacent the engagement of the socket member with the stud.

Various modifications may suggest themselves to those skilled in this art, and to this end reservation is made to make such changes as may come within the purview of the accompanying claims.

What I claim as my invention is:

1. In a device of the class described, a driving member having a fixed clutch part, a shiftable clutch part mounted for movement into and out of engagement with said fixed clutch part, a sectional socket member mounted on said shiftable clutch part for relative movement with respect thereto, and latch means for holding said shiftable clutch part in non-clutching position operable upon a predetermined movement of said socket member to release said shiftable clutch part for engagement with said fixed clutch part.

2. In a device of the class described, a driving member having a fixed clutch part, a shiftable clutch part mounted for sliding movement along the axis of rotation of said driving member into and out of engagement with said fixed clutch part, a sectional socket member mounted on said shiftable clutch part for relative movement with respect thereto along the said axis of rotation, and latch means for holding said shiftable clutch part in non-clutching position operable upon a movement of said socket member in one direction to release said shiftable clutch part for engagement with said fixed clutch part.

3. In a device of the class described, a driving member having a fixed clutch part, a shiftable clutch part mounted for movement into and out of engagement with said fixed clutch part, a sectional socket member mounted on said shiftable clutch part for relative movement with respect thereto, and latch means for holding said shiftable clutch part in non-clutching position and for coupling together said shiftable clutch part and socket member, said latch means being operable to couple the shiftable clutch part and socket member upon a relative movement between said shiftable clutch part and socket member.

4. In a device of the class described, a rotatable driving member having a fixed clutch part, a shiftable clutch part mounted for sliding movement along the axis of rotation of said driving member into and out of engagement with said fixed clutch part, a sectional socket member, means for mounting said socket sections upon said shiftable clutch part for movement toward and from one another and for relative axial sliding movement with respect thereto, and means controlled by the relative axial movement of said shiftable clutch part and socket member for controlling the movement of said shiftable clutch part into and out of engagement with said fixed clutch part.

5. In a device of the class described, a driving member having a fixed clutch part, a shiftable clutch part mounted for movement into and out of engagement with said fixed clutch part, a sectional socket member mounted on said shiftable clutch part, and means for preventing driving engagement of said clutch parts prior to the engagement of said socket member with the work.

6. In a device of the class described, a rotatable driving member having a fixed clutch part, a shiftable clutch part mounted for movement into and out of engagement with said fixed clutch part, a socket member mounted on said shiftable clutch part, and latching means for preventing movement of said shiftable clutch part into clutching position released by said socket member after engagement of said socket member with the work.

7. In a device of the class described, a rotatable driving member having a fixed clutch part, a driven member including a shiftable clutch part and a sectional socket member carried thereby, and latching means for selectively coupling said shiftable clutch part to said driving member or to said socket member.

8. In a device of the class described, a rotatable driving member having a fixed clutch part, a shiftable clutch part mounted for axial movement into and out of engagement with said fixed clutch part, a sectional socket member mounted on said shiftable clutch part for relative axial movement with respect thereto, and latch means for holding said shiftable clutch part in non-clutching position operable upon a predetermined movement of said socket member to release said shiftable clutch part for engagement with said fixed clutch part and to couple said socket member with said shiftable clutch part against relative axial movement therebetween.

9. In a device of the class described, a rotating driving member, a clutch part carried thereby, a complementary clutch part slidably mounted on said driving member for sliding movement along the axis of rotation thereof into and out of engagement with said first mentioned clutch part, a sectional socket member, means for mounting said socket sections upon said complementary clutch part for movement toward and from one another and for relative axial sliding movement with respect thereto, and latching means carried by said complementary clutch part engageable with said driving member for holding said complementary clutch part in non-clutching position and operable after a predetermined movement of said socket member to release said complementary clutch part for engagement with said first mentioned clutch part.

10. In a device of the class described, a rotating driving member, a clutch part carried thereby, a complementary clutch part slidably mounted on said driving member for sliding movement along the axis of rotation thereof into and out of engagement with said first mentioned clutch part, a sectional socket member, means for mounting said socket sections upon said complementary clutch part for movement toward and from one another and for relative axial sliding movement with respect thereto, latch means carried by said complementary clutch part engaging said driving member for holding said complementary clutch part in non-clutching position, said socket member moving axially of said complementary clutch member upon engagement with the work, and means operable upon such movement and after engagement of the socket member with the work for releasing said latching means.

11. In a device of the class described, a rotating driving member, a clutch part carried thereby, a complementary clutch part slidably mounted on said driving member for sliding movement along the axis of rotation thereof into and out of engagement with said first mentioned clutch part, a sectional socket member, means for mounting said socket sections upon said complementary clutch part for movement toward and from one another and for relative axial movement with respect thereto, said socket member being substantially rectangular in cross section, said complementary clutch part having a rectangular recess to receive said socket member, and snugly engaging said socket sections upon relative movement of said socket member in one direction to force said socket sections into abutting relation.

12. In a device of the class described, a rotating driving member, a clutch part carried thereby, a complementary clutch part slidably mounted on said driving member for sliding movement along the axis of rotation thereof into and out of engagement with said first mentioned clutch part, a sectional socket member, means for mounting said socket sections upon said complementary clutch part for movement toward and from one another and for relative axial movement with respect thereto, said socket member being substantially rectangular in cross section, said complementary clutch part having a rectangular recess to receive said socket member and snugly engaging said socket sections upon relative movement of said socket member in one direction to force said socket sections into abutting relation, and latch means for holding said complementary clutch part in non-clutching position operable upon a predetermined movement of said socket member to release said complementary clutch part for engagement with said fixed clutch part.

FORD R. LAMB.